US008853968B2

(12) United States Patent
Myers et al.

(10) Patent No.: US 8,853,968 B2
(45) Date of Patent: Oct. 7, 2014

(54) ADAPTIVE COMPENSATION FOR EFFECTS OF CAT-EAR DIMMERS ON CONDUCTION ANGLE MEASUREMENT

(71) Applicant: iWatt Inc., Campbell, CA (US)

(72) Inventors: Richard M. Myers, Grass Valley, CA (US); Clarita C. Poon, Pleasanton, CA (US); Liang Yan, Milpitas, CA (US)

(73) Assignee: Dialog Semiconductor Inc., Campbell, CA (US)

(*) Notice: Subject to any disclaimer, the term of this patent is extended or adjusted under 35 U.S.C. 154(b) by 53 days.

(21) Appl. No.: 13/786,268

(22) Filed: Mar. 5, 2013

(65) Prior Publication Data

US 2013/0241441 A1 Sep. 19, 2013

Related U.S. Application Data

(60) Provisional application No. 61/610,380, filed on Mar. 13, 2012.

(51) Int. Cl.
*H05B 33/08* (2006.01)

(52) U.S. Cl.
CPC .......... *H05B 33/0833* (2013.01); *Y02B 20/347* (2013.01); *H05B 33/0815* (2013.01)
USPC ........... 315/307; 315/308; 315/224; 315/246; 315/247

(58) Field of Classification Search
CPC ............... H05B 33/0815; H05B 37/02; H05B 33/0818; H05B 33/0824; H05B 33/0845; H05B 33/0851; H05B 33/0848; H05B 41/3924; H05B 33/0812; H05B 33/0833; H05B 33/086; H05B 33/0884; Y02B 20/346; Y02B 20/34
USPC ......... 315/307, 308, 224, 246, 247, 268, 272, 315/273
See application file for complete search history.

(56) References Cited

U.S. PATENT DOCUMENTS

| | | | | |
|---|---|---|---|---|
| 8,212,491 B2* | 7/2012 | Kost et al. | ...... | 315/247 |
| 8,547,034 B2* | 10/2013 | Melanson et al. | ...... | 315/247 |
| 8,581,504 B2* | 11/2013 | Kost et al. | ...... | 315/209 R |
| 8,610,365 B2* | 12/2013 | King et al. | ...... | 315/246 |
| 8,680,787 B2* | 3/2014 | Veskovic | ...... | 315/307 |
| 8,716,948 B2* | 5/2014 | Lee et al. | ...... | 315/224 |

* cited by examiner

*Primary Examiner* — Vibol Tan
(74) *Attorney, Agent, or Firm* — Fenwick & West LLP (57) ABSTRACT

A dimmable light emitting lamp configured to interface with cat-ear dimmer switches. The lamp includes one or more light emitting devices. The lamp also includes circuitry configured to receive an input voltage and provide regulated current to the one or more light emitting devices. The input voltage has a first voltage pulse that does not represent a dimming level of a dimmer switch and a second voltage pulse that represents the dimming level of the dimmer switch. The circuitry determines a first duration corresponding to a length of the first voltage pulse and a second duration corresponding to a length of the second voltage pulse responsive to first duration. The circuitry adjusts the regulated current to the light emitting devices according to the second duration to adjust output light intensity of the light emitting devices.

20 Claims, 7 Drawing Sheets

ADAPTIVE COMPENSATION FOR EFFECTS OF CAT-EAR DIMMERS ON CONDUCTION ANGLE MEASUREMENT

CROSS REFERENCE TO RELATED APPLICATION

This application claims priority from U.S. Provisional Patent Application No. 61/610,380, filed on Mar. 13, 2012, the contents of which are incorporated by reference herein in their entirety.

BACKGROUND

1. Field of Technology

Embodiments disclosed herein relate generally to a light emitting lamp and more specifically a light emitting lamp that adaptively compensates for effects of cat-ear dimmers on conduction angle measurement.

2. Description of the Related Arts

Dimmer switches are devices used to control the brightness of light bulbs. One type of dimmer switch is a phase cut dimmer switch, also known as TRIAC dimmers. A phase cut dimmer switch reduces the amount of power delivered to a light bulb by receiving an AC voltage waveform and cutting off a portion of the AC voltage waveform. Some phase cut dimmers known as "cat-ear" dimmers use cat-ear power supplies to power the dimmer. These power supplies have an energy storage capacitor which provides power to the dimmer when the AC input is cut off.

Figure 1:
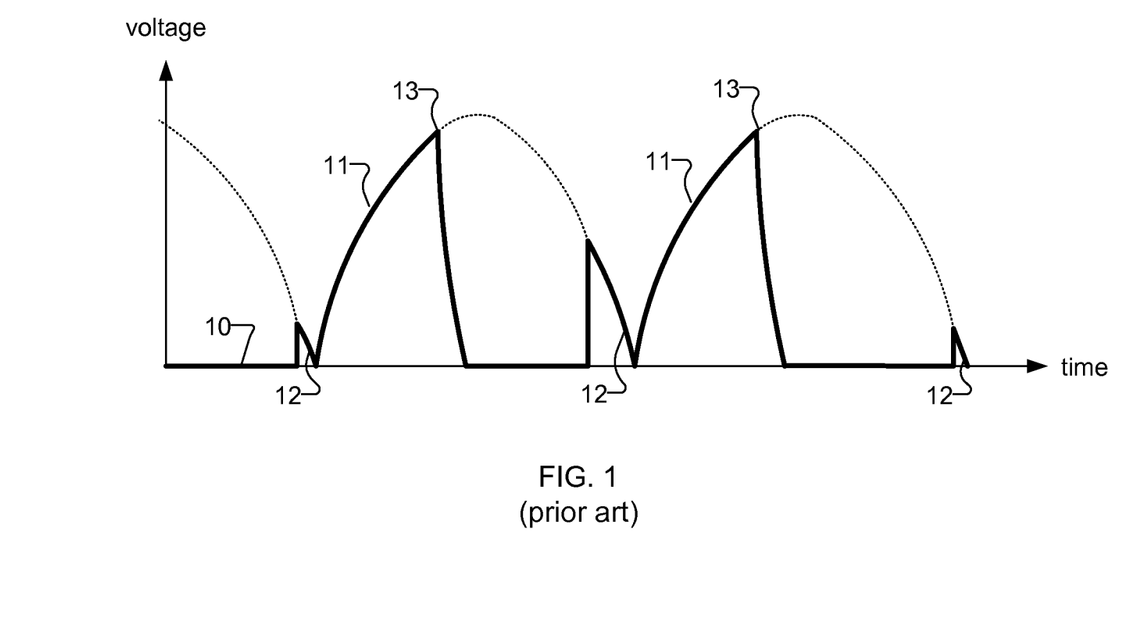
FIG. 1 illustrates an output waveform of a dimmer switch after it is rectified.

FIG. 1 illustrates the voltage waveform 10 output by a cat-ear dimmer after it has been passed through a full wave rectifier. Each cycle of the voltage waveform 10 includes a phase cut 13 that is set by the dimmer switch to cut off the AC input voltage and reduce the power delivered to a light bulb. The phase cut creates dimming pulses 11. The energy storage capacitor of the cat-ear power supply charges through the light bulb around the zero-crossings of the AC source voltage. Some cat-ear dimmers assume worst case conditions and fix the charging time. Other cat-ear dimmers employ an additional circuit to monitor the energy storage capacitor voltage and increase or decrease the charging time as needed. This charging behavior creates additional pulses 12 in the output voltage waveform 100 that have the appearance of cat-ears.

Cat-ear dimmers have conventionally been used in conjunction with incandescent light bulbs. However, interfacing cat-ear dimmers with newer lighting technologies, such as LED-based lamps, represents a significant design challenge. When operating from a phase cut waveform, a dimmable LED controller may attempt to use the width of the dimmer pulse 11 as a proxy for the dimming level of the dimmer switch. However, the presence of the cat-ear pulse 12 makes it difficult to correctly measure the size of the dimmer pulse 11. The cat-ear pulse 12 can change from cycle to cycle. This results in instabilities in the measurements and causes the LED lamp to flicker. Additionally, cat-ear dimmers are only one of the many different dimmers that can be interfaced with a LED-based lamp. LED controllers that are specifically designed to work with cat-ear dimmers can result in sub-optimal performance when used with other types of dimmers.

SUMMARY

The embodiments disclosed herein describe a dimmable light emitting lamp that can be dimmed by a cat-ear dimmer. In one embodiment, the dimmable light emitting lamp comprises one or more light emitting devices, such as LEDs. The light emitting lamp includes circuitry configured to receive a signal indicative of an input voltage of the light emitting lamp and provide regulated current to the one or more light emitting devices based on the signal indicative of the input voltage. The input voltage has a first voltage pulse that does not represent a dimming level of a dimmer switch (e.g., a cat-ear pulse) and a second voltage pulse that represents the dimming level of the dimmer switch (e.g., a dimming pulse). The first voltage pulse is adjacent to the second voltage pulse in time. The circuitry determines a first duration corresponding to a length of the first voltage pulse and determines a second duration corresponding to a length of the second voltage pulse responsive to first duration. The circuitry adjusts the regulated current to the light emitting devices according to the second duration to adjust output light intensity of the light emitting devices. By determining a duration corresponding to the first voltage pulse and using this to determine a duration corresponding to the second voltage pulse, the dimming level of the dimmer switch can be accurately determined regardless of the existence of any cat-ear pulses.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments disclosed herein can be readily understood by considering the following detailed description in conjunction with the accompanying drawings.

DETAILED DESCRIPTION OF EMBODIMENTS

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

Embodiments disclosed herein describe a dimmable light emitting lamp that can be dimmed by a cat-ear type dimmer switch. In one embodiment, the dimmable light emitting lamp includes one or more light emitting devices, such as light emitting diodes (LEDs). The dimmable light emitting lamp also includes circuitry configured to receive a sensing signal indicative of an input voltage and provide regulated current to the one or more light emitting devices. The input voltage has a cat-ear pulse and a dimming pulse. An approximate duration of the cat-ear pulse is determined and accounted for when determining a duration of the dimming pulse. The circuitry regulates current to the light emitting devices according to the duration of the dimming pulse to adjust the intensity of light emitted by the light emitting devices. In this manner, the dimming level of the dimmer switch can be accurately determined and used to set the brightness of the LED lamp, regardless of the size of the cat-ear pulses.

Figure 2:
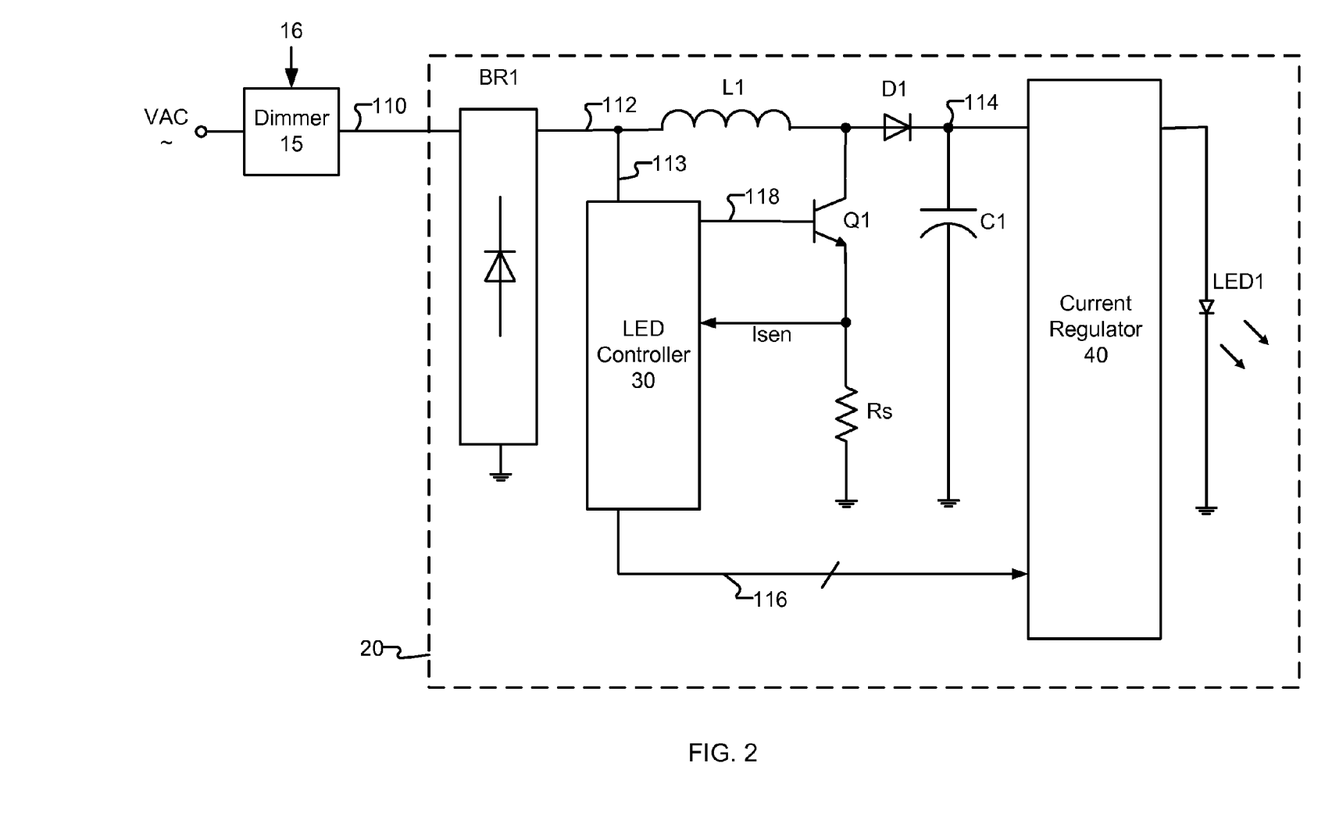
FIG. 2 illustrates a LED lamp system according to one embodiment.

FIG. 2 illustrates a LED lamp system including a dimmer switch 15 and a LED lamp 20. The dimmer switch 15 receives a dimming input signal 16, which is used to set the target light output intensity of LED lamp 20. Dimming input signal 16 can be provided either manually (via a knob or slider switch, not shown herein) or via an automated lighting control system (not shown herein). Dimmer switch 15 receives an AC input voltage signal VAC and adjusts the V-RMS value of the lamp input voltage 110 in response to dimming input signal 16. In other words, control of light intensity of LED lamp 20 by the dimmer switch 15 is achieved by adjusting the V-RMS value of the lamp input voltage 110 that is applied to LED lamp 20.

In one embodiment, the dimmer switch 15 is a conventional cat-ear dimmer switch. The cat-ear dimmer switch 15 employs phase angle switching to cut off a portion of the AC input signal VAC when generating the lamp input voltage 110, thereby adjusting the V-RMS value of the lamp input voltage 110. The dimmer switch 15 may use a TRIAC or similar circuit to implement phase angle switching. Additionally, the dimmer switch 15 may be a trailing edge dimmer that uses phase angle switching to generate a dimming pulse at the beginning of each AC half-cycle. When the dimmer switch 15 is a trailing edge dimmer, any cat-ear pulses generated by the dimmer switch 15 appear at the end of each AC half-cycle. For clarity, the embodiments described herein will be explained by reference to a trailing edge dimmer. Alternatively, the dimmer switch 15 may be a leading edge dimmer that ses phase angle switching to generate a dimming pulse at the end of each AC half-cycle and cat-ear pulses at the beginning of each AC half-cycle.

The LED lamp 20 includes a bridge rectifier BR1, a magnetic component (e.g. an inductor) L1, a diode D1, a capacitor C1, a drive transistor Q1, a sense resistor Rs, a dimmable LED controller 30, a current regulator 40, and a light emitting diode LED1. Inductor L1, diode D1, capacitor C1 and drive transistor Q1 form a boost type switching AC-DC power converter. LED controller 30 generates a dynamic switch drive signal 118 that operates drive transistor Q1 as the switching device of the power converter. The power converter generates an output voltage 114 from the rectified input voltage 112, and the output voltage 114 may have a higher voltage level than the input voltage 112 due to the boost arrangement of the power converter. Drive transistor Q1 is shown as a bipolar junction transistor (BJT), but in other embodiments drive transistor Q1 can be a metal oxide semiconductor field effect transistor (MOSFET). Note that in other embodiments, other power converter topologies may be used for the power converter such as a flyback topology. Additionally, in other embodiments other light emitting devices other than a light emitting diode LED1 may be used. Additionally, there may be more than one LED1 in the LED lamp 20.

The bridge rectifier BR1 receives the lamp input voltage 110 and generates a rectified input voltage 112, which is then sensed by the LED controller 30 via input sensing signal 113. In one embodiment, the input sensing signal 113 may be the same as the rectified input voltage 112. For clarity, the embodiments described herein will assume that the input sensing signal 113 has the same voltage level as the input voltage 112. In other embodiments, the rectified input voltage 112 may be passed through a resistor divider to reduce a voltage level of the rectified input voltage 112, which is then used as the input sensing signal 113.

Figure 3:
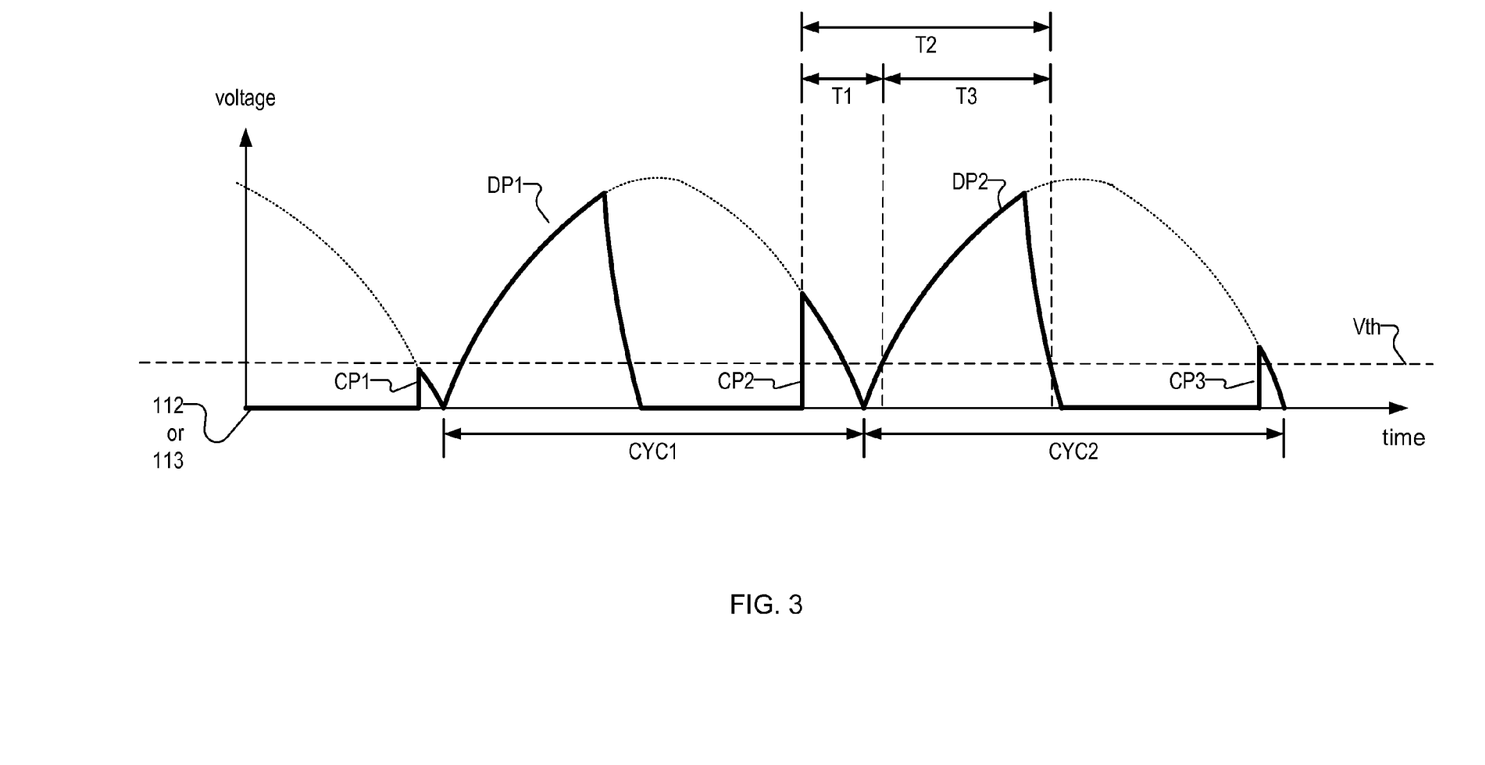
FIG. 3 illustrates a rectified input voltage or input sensing signal, according to one embodiment.

Referring to FIG. 3, illustrated is a rectified input voltage 112 or input sensing signal 113, according to an embodiment. The rectified input voltage 112 is cyclical. CYC1 represents one voltage cycle of the rectified input voltage 112, and CYC2 represents another voltage cycle of the rectified input voltage 112. Because the rectified input voltage 112 is derived from an AC voltage VAC, each voltage cycle of the rectified input voltage 112 represents an AC-half cycle that starts when the AC voltage VAC crosses zero volts a first time and ends when the AC voltage VAC crosses zero volts a second time. For example if the AC voltage operates at 60 Hz with a period of 16.7 ms, each voltage cycle of the rectified input voltage 112 has a duration of 8.33 ms.

The rectified input voltage 112 includes dimming pulses DP that represent an intended dimming level set by the dimmer 15. The length of the dimming pulses DP increase as the dimming level set by the dimmer increases, and the length of the dimming pulses DP decrease as the dimming level set by the dimmer decreases. The length of the dimming pulse is sometimes referred to as the phase angle or conduction angle because it is a measure of a fraction of a full sinusoidal AC period (360 degrees) during which the dimmer is conducting. The dimming pulses DP appear at the beginning of each voltage cycle CYC because dimmer 15 is a trailing edge dimmer.

The rectified input voltage 112 also includes cat-ear pulses CP at the end of each cycle voltage CYC. Cat-ear pulses CP do not represent the intended dimming level of the dimmer 15. Cat-ear pulses CP are instead caused by the cat-ear power supply in the dimmer 15 charging its storage capacitor at the end of each voltage cycle CYC. The cat-ear pulses CP are unpredictable and may change in size and length from one cycle to the next. Additionally, each cat-ear pulse (e.g. CP2) is back to back with a dimmer pulse (e.g., DP2). In other words, each cat-ear pulse is immediately adjacent to a dimmer pulse from the following voltage cycle CYC of the rectified input voltage 112.

Referring to both FIG. 2 and FIG. 3, the LED controller 30 receives a voltage sensing signal 113 that tracks a voltage level of the rectified input voltage 112. The LED controller 30 determines, for each dimmer pulse DP, an approximate length of the dimming pulse DP as a proxy for the dimmer level setting of the dimmer switch 15. In one embodiment LED controller 30 is an integrated circuit.

In one embodiment, cat-ear pulses CP and dimming pulses DP from adjacent waveform cycles are analyzed as pairs. Referring specifically to cat-ear pulse CP2 and dimming pulse DP2, the LED controller 30 measures a duration of time T1 that corresponds to an approximate length of cat-ear pulse CP2. The duration of time can be measured in any unit of time, such as milliseconds, clock cycles, etc. The LED controller 30 also measures a duration of time T2 that corresponds to an approximate combined length of both the cat-ear pulse CP2 and dimmer pulse DP2. The LED controller 30 then computes a duration of time T3 that corresponds to a length of the dimmer pulse DP2 by subtracting duration T1 from the combined duration T2. Thus, by taking the length of the cat-ear pulse CP2 into account when computing the length of the dimmer pulse DP2, the effect of the cat-ear pulse CP2 on the measurement of the dimmer pulse is cancelled out and results in a more accurate measurement for the dimmer pulse DP2.

LED controller 30 also generates one or more current control signals 116 for regulating an amount of current flowing through the LED1. Because LEDs are current controlled devices, regulating their current effectively regulates their brightness. The current control signals 116 are generated according to the length of the dimming pulses DP. Longer dimming pulses DP result in a higher current being delivered to LED1. Shorter dimming pulses DP result in a lower current being delivered to LED1. LED controller 40 may employ pulse-width-modulation (PWM) or constant current control to achieve a target light output intensity for LED1.

The current regulator 40 receives the DC output voltage 114 from the power converter. The current regulator 40 also receives one or more current control signals 116 from the power controller 30 and regulates current through the light emitting diode LED1 under the control of the current control signals 116. In one embodiment, current regulator 40 is a collection of components that uses a flyback topology to regulate current through LED1 under the control of the current control signals 116.

In some embodiments, LED controller 30 operates the transistor Q1 in two different modes: a linear mode and a switching mode. During the linear mode the LED controller 30 operates the transistor Q1 in its forward-active region as a linear current sink that provides a bleeding current for the dimmer 15. The power controller 30 sets the bleeding current to a level that is enough to satisfy the needs of the cat-ear power supply in the dimmer, but not so high that the current causes significant power loss. During the switching mode, the LED controller 30 controls the ON and OFF times of transistor Q1 to generate a DC output voltage 114 from the rectified input voltage 112. Turning the transistor Q1 ON and OFF switches the transistor Q1 between its cutoff region and its saturation region. When the transistor Q1 is ON, current flowing into the inductor L1 increases. When the transistor Q1 is OFF, current flowing into the inductor L1 decreases. The resulting output voltage 114 may have a higher voltage level than the rectified input voltage 112.

In one embodiment, the LED controller 30 also detects whether the dimmer 15 is a cat-ear dimmer by looking for cat-ear pulses CP. The LED controller 30 controls the current to the dimmer 15 differently based on whether it is a cat-ear dimmer. In one embodiment, if the dimmer 15 is a cat-ear dimmer, the LED controller 30 extends the length of the linear mode and decreases the length of the switching mode. In one embodiment, if the dimmer 15 is not a cat-ear dimmer, the LED controller 30 does not extend the length of the linear mode.

Figure 4:
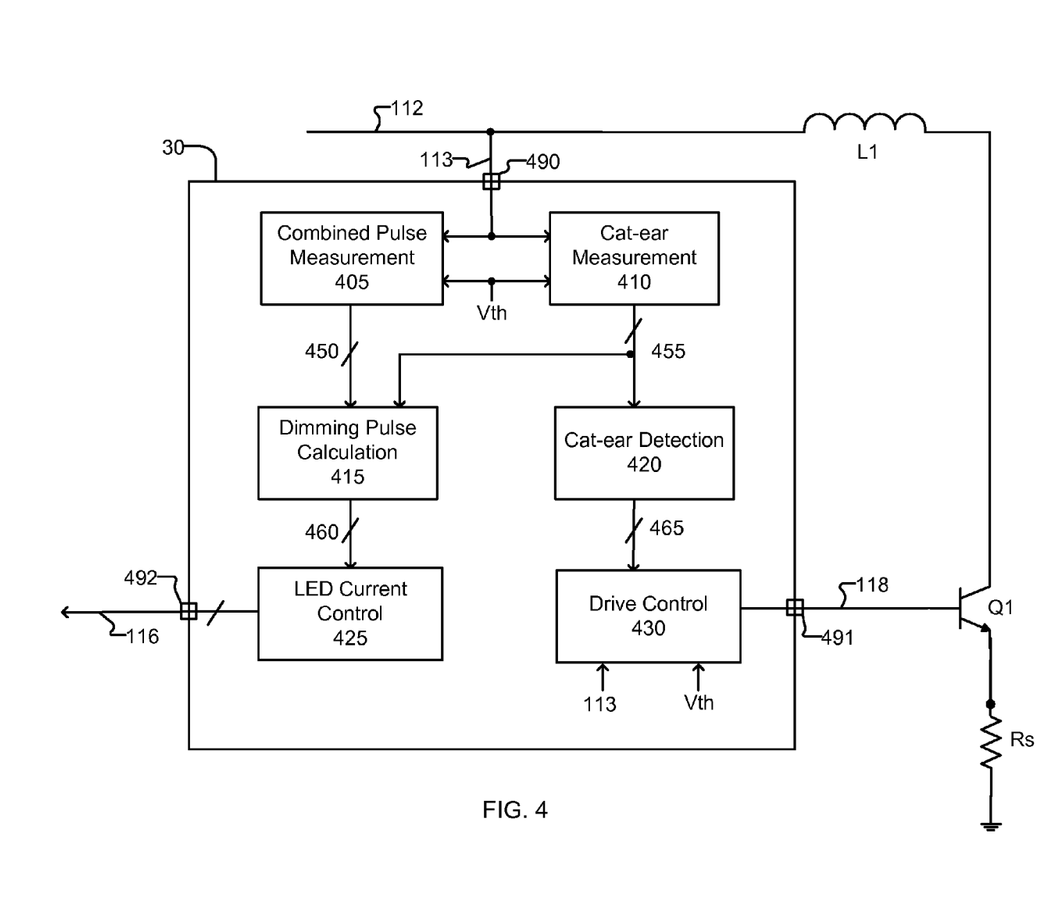
FIG. 4 illustrates detailed view of a power controller of the LED lamp system, according to one embodiment.

FIG. 4 illustrates one embodiment of a detailed view of the LED controller 30, according to one embodiment. As shown, the LED controller 30 includes a combined pulse measurement block 405, a cat-ear measurement block 410, a dimming pulse calculation block 415, cat-ear detection block 420, a LED current control block 425 and a drive control block 430. In one embodiment, each of the blocks in the power controller may be implemented with one or more hardware circuits. The LED controller 30 also includes several ports 490, 491 and 492 for receiving and outputting various signals from the LED controller 30. In other embodiments, there may be additional components or connections that are not shown in the figure for clarity. Portions of FIG. 4 will be explained by reference to FIG. 3.

The combined pulse measurement block 405 measures a duration of time that represents a combined length of the cat-ear pulse CP and a dimmer pulse DP from adjacent waveform cycles relative to the threshold voltage Vth. For example, referring back to FIG. 3, the combined pulse measurement block may determine that the duration of time corresponding to the combined length of cat-ear pulse CP2 and dimmer pulse DP2 is T1.

In one embodiment, the combined pulse measurement block 405 receives the input sensing signal 113 that is indicative of the input voltage 112 via port 490. The combined pulse measurement block 405 also receives the threshold voltage Vth. The threshold voltage level Vth may be internally generated by the LED controller 30 and set to a positive voltage level greater than zero. The combined pulse measurement block 405 compares the threshold voltage Vth to the input sensing signal 113 and looks for a rising edge of the input sensing signal 113 that crosses the threshold voltage level Vth. Once the rising edge of the input sensing signal 113 crosses the threshold voltage level Vth, the combined pulse measurement block 405 resets a counter and starts incrementing the counter at a fast clock rate (e.g., 10 kHz). Once a falling edge of the input sensing signal 113 drops below the threshold voltage Vth, the counter stops counting. A blocking circuit also causes any rising or falling edges of the input sensing signal 113 to be ignored within a fixed amount of time after a first rising edge is first detected. For example, referring back to FIG. 3, the rising edge of cat pulse CP2 starts the counter once it crosses the threshold Vth. The falling edge of cat pulse CP2 and the rising edge of dimming pulse DP2 are ignored because of the blocking circuit. The counter stops incrementing when the falling edge of dimming pulse DP2 falls below the threshold voltage Vth.

The combined pulse measurement block 405 outputs one or more combined pulse duration signals 450 that are indicative of a combined length of a cat-ear pulse CP and dimming pulse DP from adjacent cycles of the rectified input voltage 112, as indicated in the input sensing signal 113. The combined pulse measurement signals 450 may be a digital output, such as the value stored in the counter of the combined pulse measurement block 405. In other embodiments, the combined pulse measurement signals 450 may be an analog voltage representing the combined length.

The cat-ear measurement block 410 measures a duration of time that corresponds to an approximate length of a cat-ear pulse CP. In one embodiment, the cat-ear measurement block 410 receives the input sensing signal 113 and the threshold voltage Vth. The cat-ear measurement block 410 measures a duration of time that corresponds to a length of the cat-ear pulse relative to the threshold Vth. For example, referring back to FIG. 3, the cat-ear measurement block 410 may determine that the duration of time is T1, which is measured between when the rising edge of cat-ear pulse CP2 crosses the threshold voltage Vth and when the rising edge of the adjacent dimming pulse DP2 crosses the threshold voltage Vth. T1 is not an exact measurement of the length of the cat-ear pulse CP2, but is a proxy for the length of the cat-ear pulse CP2. In some sense, the measured duration of time T1 can be viewed as an amount of error caused by the cat-ear pulse CP2 that is used to accurately determine the duration of time T3 corresponding to the dimming pulse DP2.

The cat-ear measurement block 410 outputs one or more cat-ear duration signals 455 that correspond to a length of a cat-ear pulse CP. The cat-ear duration signals 455 may be digital or analog signals that are indicative of the length of a cat-ear pulse CP. The details of the cat-ear measurement block 410 are described in greater detail by reference to FIG. 6.

The dimming pulse calculation block 415 receives the combined pulse duration signals 450 that correspond to a combined length of a cat-ear pulse CP and dimming pulse DP from adjacent voltage cycles CYC. The dimming pulse calculation block 415 also receives the cat-ear duration signals 455 that correspond to a length of the cat-ear pulse CP. The dimming pulse calculation block 415 then calculates a duration of time that corresponds to an approximate length of the dimming pulse DP with the following equation:

$$DimD = TotD - CatD \qquad \text{(equation 1)}$$

where DimD is the calculated duration for the length of the dimming pulse. TotD is the combined duration for both a cat-ear pulse CP and an adjacent dimmer pulse DP. CatD is the duration of time corresponding to the length of the cat-ear pulse CP. Thus, applying equation 1 to FIG. 3, the duration T3 for dimming pulse DP2 can be calculated by subtracting the duration T1 for the cat-ear pulse CP from the combined duration T2.

Due to the use of a threshold Vth to detect the existence of pulses, some cat-ear pulses CP may not be detected at all. For example, in FIG. 3, cat-ear pulse CP1 is not detected because it never exceeds the threshold voltage Vth. The duration of cat-ear pulse CP1 determined by the cat-ear measurement block 410 will thus be zero. However, even if the cat-ear pulse CP1 is so small that it is not detected, the duration of the dimmer pulse DP1 can still be determined with equation 1.

In one embodiment, the dimming pulse calculation block 415 may perform the dimming pulse calculation in every voltage cycle CYC of the rectified input voltage 112. In other embodiments, the dimming pulse calculation block may only perform the calculation in a fraction of the voltage cycles CYC, such as once in every hundred voltage cycles CYC in order to reduce power consumption.

The dimming pulse calculation block 415 also outputs one or more dimming pulse duration signals 460 that are indicative of a length of the dimming pulse DP. In some embodiments, the dimming pulse calculation signals are digital signals, and in other embodiments the signals are analog signals.

The LED current control block 425 receives the dimming pulse duration signals 460 and generates one or more current control signals 116 for regulating current through LED1. LED current control block 425 can use PWM or constant current control, as previously mentioned, to achieve the desired light output intensity via the current control signals 116. In one embodiment, the current control block 425 generates current control signals 116 that result in higher light output intensity as the duration of the dimming pulses DP increase. The current control block 425 also generates current control signals 116 that result in lower light output intensity as the duration of the dimming pulses DP decrease. The current control signals 116 are output via ports 492.

The cat-ear detection block 420 determines whether the dimmer switch 15 is a cat-ear dimmer. In one embodiment, the cat-ear detection block 420 receives the cat-ear measurement signals 410 that indicate a length of the cat-ear pulse CP. The cat-ear detection block 420 compares the length of the cat-ear pulse CP to a threshold length (e.g. a threshold of zero). If the length of the cat-ear pulse CP exceeds the threshold length it is determined that the dimmer switch 15 is a cat-ear dimmer. The cat-ear detection block 420 may also include a register that stores a bit indicating whether a cat-ear dimmer has been detected. Once a cat-ear dimmer is detected, the value of the register may not be cleared until power is completely removed from the power controller 30. This ensures that the power controller 30 is aware of the existence of a cat-ear dimmer once the cat-ear dimmer is detected. The car ear detection block 420 then outputs a dimmer type signal 465 that indicates whether the dimmer 15 is a cat-ear dimmer.

Figure 5:
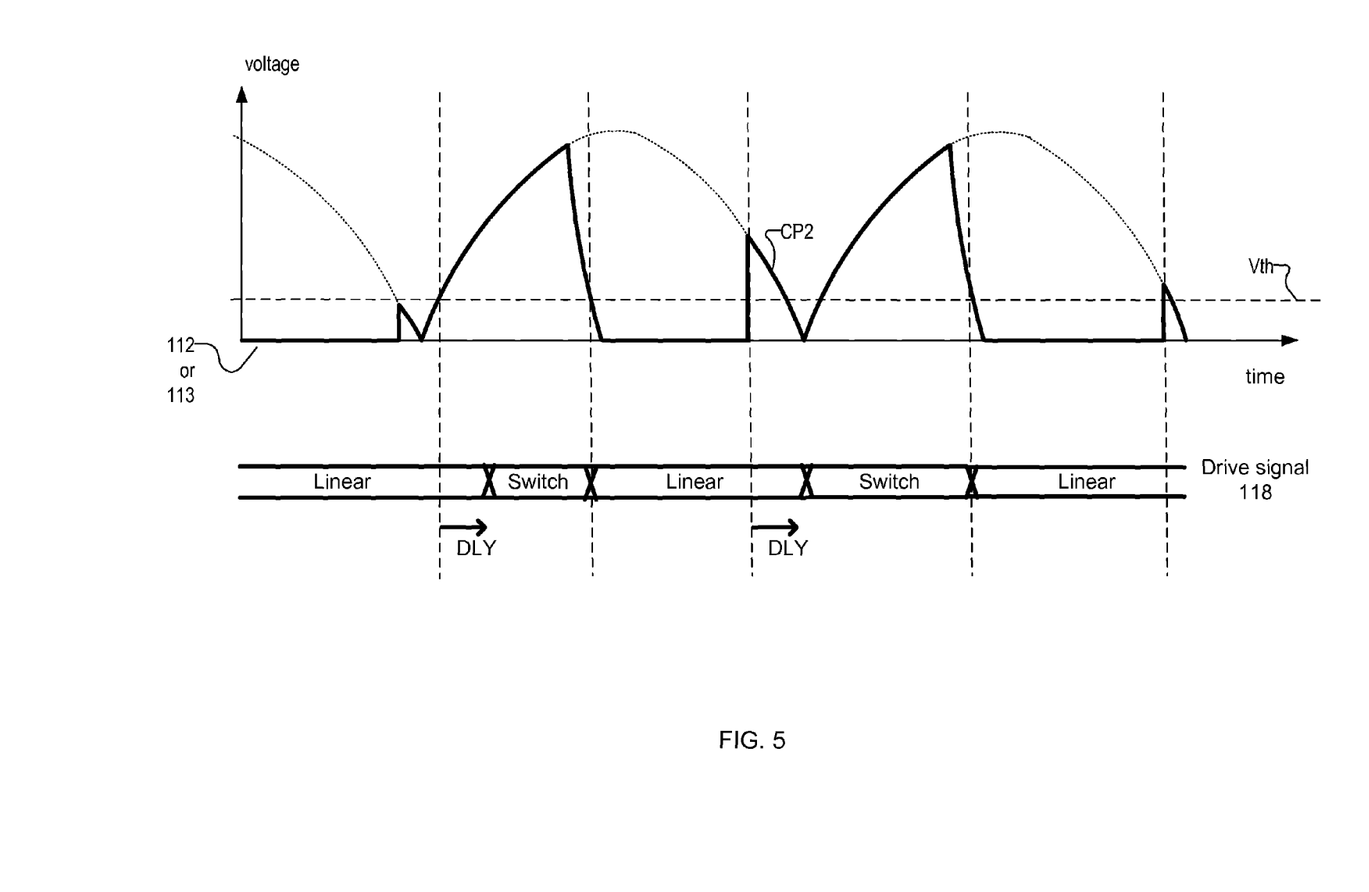
FIG. 5 illustrates the operation of the dimmer current control block, according to an embodiment.

The drive control block 430 controls a level of the drive signal 118 to the transistor Q1 depending on whether a cat-ear dimmer is present, as indicated by the cat-ear type signal 465. Referring now to FIG. 5, illustrated is the operation of the drive control block 430, according to an embodiment. When the input sensing signal 113 is below a threshold level Vth, the dimmer control block 430 generates a drive signal 118 that operates the transistor Q1 in linear mode to provide a bleeding current to the dimmer switch 15. When the input sensing signal 113 exceeds the threshold level Vth, the dimmer control block generates a drive signal 118 that operates the transistor Q1 in switching mode by switching the transistor Q1 on and off. From a power efficiency perspective, maximizing the amount of time during which the transistor Q1 operates in switching mode increases the efficiency of the power converter.

The delay between a rising edge of the input voltage 112, as indicated by the input sensing signal 113, and when the switching mode begins is controlled by whether the dimmer 15 is a cat-ear dimmer. If dimmer 15 is a cat-ear dimmer, a fixed delay DLY is introduced between when the rising edge of the input sensing signal 113 crosses the threshold voltage Vth and when switching mode begins. If, on the other hand, a different type of dimmer 15 other than a cat-ear dimmer is present, there would be no delay between the rising edge of the input voltage 112, as indicated by the input sensing signal 113, and the beginning of the switching mode.

Controlling the delay between linear mode and switching mode allows the LED controller 130 to handle different types of dimmers 15 while still being power efficient. When no cat-ear dimmer is present, the drive signal 118 operates the transistor Q1 in switching mode as soon as the input sensing signal 113 crosses the threshold Vth. This maximizes the amount of time spent in switching mode and increases the efficiency of the power converter. On the other hand, when a cat-ear dimmer is present, operating the transistor Q1 in switching mode as soon as the input sensing signal 113 crosses the threshold Vth would prevent the capacitor in the cat-ear power supply from charging. Thus, to accommodate cat-ear dimmers, the linear mode is extended by a delay DLY. Extending the linear mode reduces power efficiency, but allows the power controller 30 to accommodate the special needs of cat-ear dimmers.

Figure 6:
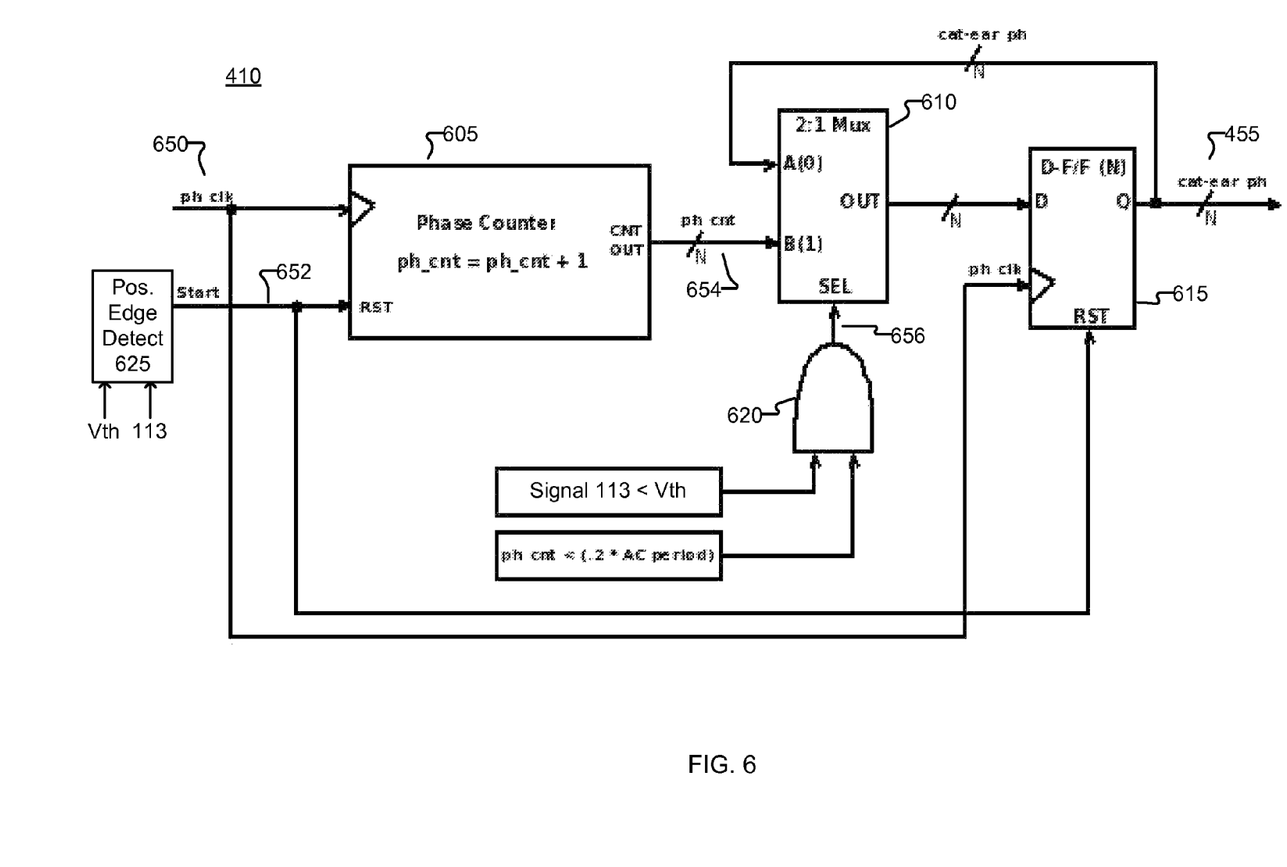
FIG. 6 illustrates a detailed view of a cat-ear measurement block of the power controller from FIG. 4, according to one embodiment.

FIG. 6 illustrates a more detailed view of a cat-ear measurement block 410, according to an embodiment. The cat-ear measurement block includes a positive edge detection block 652, a phase counter 605, a multiplexer 610, a D flip flop 615, and an AND gate 620. The positive edge detection block 625 compares the input sensing signal 113 to the threshold voltage Vth and issues a start pulse 652 whenever a rising edge of the input sensing signal 113 crosses the threshold voltage Vth. The edge detection block 625 also includes a blanking circuit that ignores any rising edges within a fixed amount of time after an initial rising edge is detected. Thus, multiple rising edges that appear close in time to each other only result in the generation of a single start pulse 652.

The phase counter 605 counts the number of phase clocks 650 between start pulses 652. The phase clock 650 is a reference clock that runs at a higher frequency (e.g. 10 kHz) than the input voltage 112 or input sensing signal 113 (e.g. 120

Hz). Each start pulse 652 resets the phase counter 605. The phase counter 605 then increments in value until the next start pulse 652 is received. The output of the counter 605 is N phase count signals 654 that indicate the current phase count maintained by the phase counter 605.

The MUX 610, flop 615 and AND gate 620 operate together as a track-and-hold circuit. When the output 656 of the AND gate 620 is logic 1, the cat-ear duration 455 signals track the phase count 610. When the output 656 of the AND gate 620 is logic 0, the cat-ear duration signals 455 are held to their current value. Specifically, the 2:1 MUX 510 selects either the cat-ear duration signals 455 at the output of the flip flop 515 or the phase count 610 signals at the output of the phase counter 605 based on the logic level output of the AND gate 620. The output 656 of the AND gate 620 is logic 1 when both of these conditions are met: (1) the input sensing signal 113 is less than a threshold voltage and (2) the phase count indicated by the phase count signals 654 is less than 20% of an AC period (e.g., 16.7 ms). Otherwise, the output 656 of the AND gate 620 is logic 0. In other embodiments, the conditions controlling the AND gate 620 may be different. The flip-flop 615 outputs one or more cat-ear duration signals 455 corresponding to the length of a cat-ear pulse CP. The flip-flop 615 is also reset by the start pulse 652.

Figure 7:
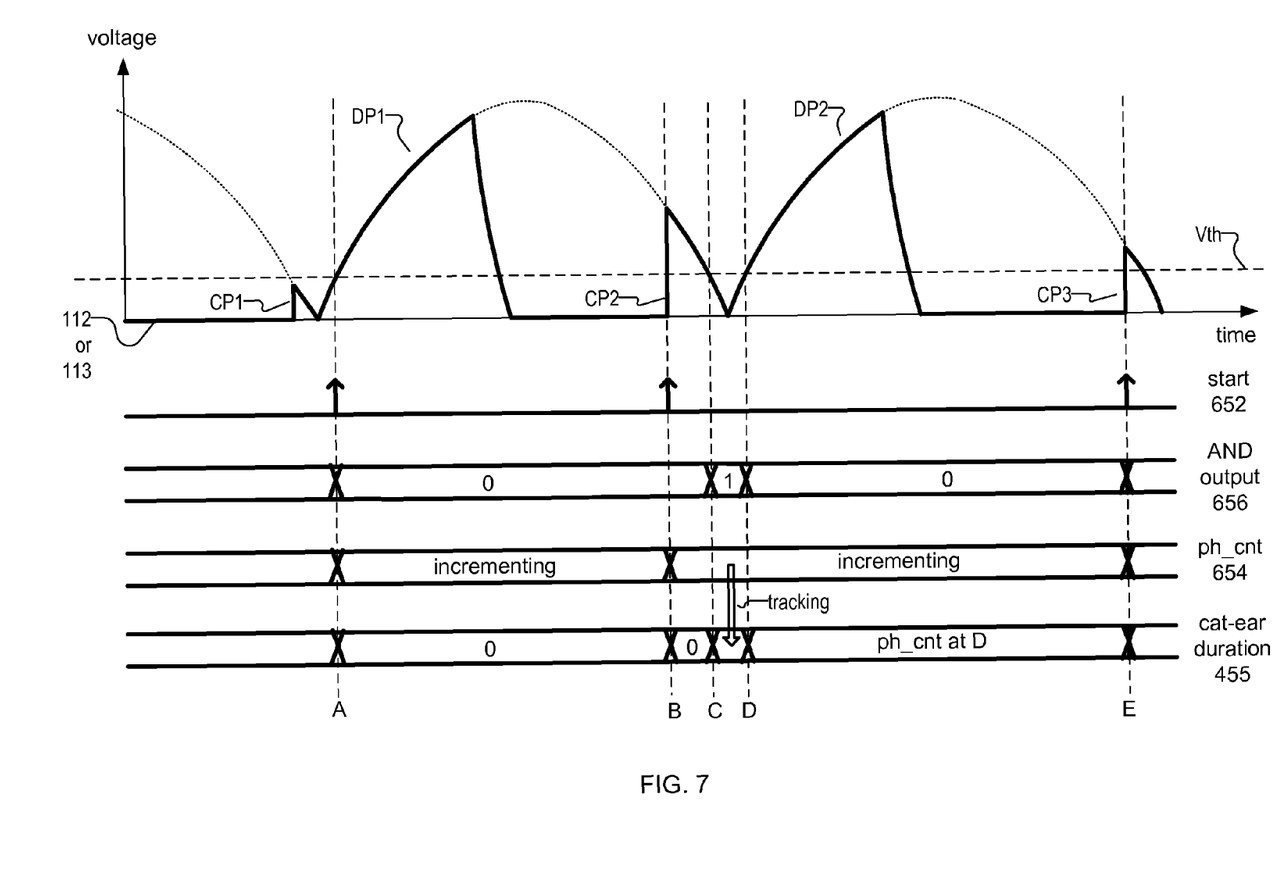
FIG. 7 illustrates a timing diagram for the cat-ear detection block of FIG. 6, according to an embodiment.

Referring now to FIG. 7, illustrated is a timing diagram for the cat-ear detection block 410 of FIG. 6, according to an embodiment. At time A, the rising edge of the input sensing signal 113 generates a start pulse 650. The start pulse 652 resets the phase count signals 654 to logic 0 and the cat-ear duration signals 455 to logic0.

Between time A and B, the phase count signals 654 start to increase in value as the phase counter 605 increments. Because the input sensing signal 113 is higher than the threshold voltage Vth, the output 620 of the AND gate is 0. The logic 0 output of the AND gate causes the MUX 510 and flop 515 to maintain the cat-ear duration signals 455 at logic 0. Once the input sensing signal 113 drops below the threshold Vth, the output of the AND gate still evaluates to 0. This is because the second condition that the phase count be less than 20% of an AC period now evaluates to false.

At time B, the rising edge of the input sensing signal 113 causes the positive edge detection block 625 to generate a start pulse 652. The start pulse 652 resets the phase count signals 654 to logic 0 and the cat-ear duration signals 455 to logic 0.

Between time B and C, the phase count signals 654 start to increase in value as the phase counter 605 increments. The output 656 of the AND gate 620 is still logic 0 because the input sensing signal 113 is higher than the threshold voltage Vth. The logic 0 output 656 of the AND gate 620 causes the MUX 610 and flop 615 to maintain the current value of the cat-ear duration signals at logic 0.

At time C, the input sensing signal 113 falls below the threshold Vth. The output 656 of the AND gate 620 now evaluates to logic 1 because both of the input conditions to the AND gate evaluate to true. The logic 1 output 656 of the AND gate 620 causes the cat-ear duration signals 455 to track the incrementing phase count signal 654 between time C and time D.

At time D, the input sensing signal 113 rises above the threshold Vth. The output 656 of the AND gate 620 now evaluates to logic 0 because the input sensing signal 113 is greater than the threshold voltage Vth. As a result, MUX 610 and flop 615 hold the value of the cat-ear duration signals 455 at a fixed value that is equal to the value of the phase count signals 656 at time D. The cat-ear duration signals 455 are held at this fixed value from time D until time E. The value of the cat-ear duration signals 455 between time D and E represents a duration of time that corresponds to the length cat-ear pulse CP2.

Once the duration of the cat-ear pulse CP2 is known, this information is used to estimate the duration of the dimming pulse DP2 from the subsequent voltage cycle, which accounts for any measurement errors that would otherwise be caused by the cat-ear pulse CP2. The duration of the dimming pulse DP2 can then be used as a proxy for the intended dimming level of the switch and used to regulate current through LED1. The duration of the cat-ear pulse CP2 can also be used to determine that a cat-ear dimmer is present so that a current can be provided to the dimmer switch 15 during periods of time when the cat-ear dimmer is charging its power supply capacitor.

Upon reading this disclosure, those of skill in the art will appreciate still additional alternative designs for adaptive compensation for effects of cat-ear dimmers on conduction angle measurement. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

What is claimed is:

1. A dimmable light emitting lamp, comprising:
  one or more light emitting devices; and
  circuitry configured to receive a signal indicative of an input voltage of the dimmable light emitting lamp and to provide regulated current to the one or more light emitting devices based on the signal indicative of the input voltage, the input voltage having a first voltage pulse that does not represent a dimming level of a dimmer switch and a second voltage pulse that represents the dimming level of the dimmer switch, the first voltage pulse being adjacent to the second voltage pulse in time,
  wherein the circuitry is configured to determine a first duration corresponding to a length of the first voltage pulse and to determine a second duration corresponding to a length of the second voltage pulse responsive to the first duration, and
  wherein the circuitry is configured to adjust the regulated current to the light emitting devices according to the second duration corresponding to the length of the second voltage pulse to adjust output light intensity of the light emitting devices.

2. The dimmable light emitting lamp of claim 1, further comprising:
  a rectifier configured to receive a lamp input voltage from the dimmer switch and to generate a rectified input voltage from the lamp input voltage,
  wherein the signal indicative of the input voltage is a signal indicative of the rectified input voltage.

3. The dimmable light emitting lamp of claim 1, wherein the light emitting devices are light emitting diodes (LED).

4. The dimmable light emitting lamp of claim 1, wherein the first voltage pulse that does not represent the dimming level of the dimmer switch precedes the second voltage pulse that represents the dimming level of the dimmer switch.

5. The dimmable light emitting lamp of claim 1, wherein the first voltage pulse that does not represent the dimming level of the dimmer switch follows the second voltage pulse that represents the dimming level of the dimmer switch.

6. The dimmable light emitting lamp of claim 1, wherein the first duration corresponding to a length of the first voltage pulse is determined responsive to an edge of the first voltage pulse crossing a threshold voltage level and an edge of the second voltage pulse crossing the threshold voltage level.

7. The dimmable light emitting lamp of claim 1, wherein the circuitry is further configured to:
determine a third duration corresponding to a combined length of both the first voltage pulse and the second voltage pulse, and
wherein the circuitry is configured to determine the second duration corresponding to the length of the second voltage pulse responsive to both the first duration corresponding to the length of the first voltage pulse and the third duration corresponding to the length of the combined length of both the first voltage pulse and the second voltage pulse.

8. The dimmable light emitting lamp of claim 1, wherein the circuitry is further configured to control current drawn from the dimmer switch responsive to the first duration corresponding to the length of the first voltage pulse.

9. The dimmable light emitting lamp of claim 8, further comprising:
a power converter coupled to the input voltage and generating an output voltage for providing the regulated current to the one or more light emitting devices,
wherein the circuitry operates a transistor of the power converter in either switching mode or linear mode, and
wherein the circuitry controls current drawn from the dimmer switch by delaying a transition between the linear mode and the switching mode responsive to the first duration corresponding to the length of the first voltage pulse.

10. The dimmable light emitting lamp of claim 9, wherein the circuitry delays the transition between the linear mode and the switching mode if the first duration corresponding to the length of the first voltage pulse exceeds a threshold duration.

11. A method of operation in a dimmable light emitting lamp, comprising:
receiving a signal indicative of an input voltage of the dimmable light emitting lamp, the input voltage having a first voltage pulse that does not represent a dimming level of a dimmer switch and a second voltage pulse that represents the dimming level of the dimmer switch, the first voltage pulse being adjacent to the second voltage pulse in time;
determining a first duration corresponding to a length of the first voltage pulse;
determining a second duration corresponding to a length of the second voltage pulse responsive to first duration; and
adjusting regulated current to one or more light emitting devices according to the second duration corresponding to the length of the second voltage pulse to adjust output light intensity of the light emitting devices.

12. The method of claim 11, further comprising:
receiving a lamp input voltage from the dimmer switch and generating a rectified input voltage from the lamp input voltage,
wherein the signal indicative of an input voltage is a signal indicative of the rectified input voltage.

13. The method of claim 11, wherein the light emitting devices are light emitting diodes (LED).

14. The method of claim 11, wherein the first voltage pulse that does not represent the dimming level of the dimmer switch precedes the second voltage pulse that represents the dimming level of the dimmer switch.

15. The method of claim 11, wherein the first voltage pulse that does not represent the dimming level of the dimmer switch follows the second voltage pulse that represents the dimming level of the dimmer switch.

16. The method of claim 11, wherein the first duration corresponding to a length of the first voltage pulse is determined responsive to an edge of the first voltage pulse crossing a threshold voltage level and an edge of the second voltage pulse crossing the threshold voltage level.

17. The dimmable light emitting lamp of claim 11, further comprising:
determining a third duration corresponding to a combined length of both the first voltage pulse and the second voltage pulse, and
wherein the second duration corresponding to the length of the second voltage pulse is determined responsive to both the first duration corresponding to the length of the first voltage pulse and the third duration corresponding to the length of the combined length of both the first voltage pulse and the second voltage pulse.

18. The method of claim 11, further comprising:
controlling current drawn from the dimmer switch responsive to the first duration corresponding to the length of the first voltage pulse.

19. The method of claim 18, wherein controlling the current drawn from the dimmer switch comprises:
operating a transistor of a power converter in either switching mode or linear mode, and
delaying a transition between the linear mode and the switching mode responsive to the first duration corresponding to the length of the first voltage pulse.

20. The method of claim 19, wherein the transition between the linear mode and the switching mode is delayed if the first duration corresponding to the length of the first voltage pulse exceeds a threshold duration.

* * * * *